United States Patent [19]

Tanaka et al.

[11] 4,259,553
[45] Mar. 31, 1981

[54] TRANSPORT HOSE WITH LEAK DETECTING STRUCTURE

[75] Inventors: Mamoru Tanaka; Hideaki Saito, both of Yokohama, Japan

[73] Assignee: Bridgestone Tire Company Limited, Tokyo, Japan

[21] Appl. No.: 48,113

[22] Filed: Jun. 13, 1979

[30] Foreign Application Priority Data

Jun. 14, 1978 [JP] Japan .................................. 53-71856

[51] Int. Cl.³ ............................................. H01H 35/24
[52] U.S. Cl. .............................. 200/81 R; 73/40.5 R; 200/83 B; 138/103
[58] Field of Search .................. 200/61.4, 81 R, 83 R, 200/83 Y, 83 B, 302; 116/70, 210, 266; 73/40.5 R, 46, 49.1; 285/93; 277/2; 138/103, 104

[56] References Cited

U.S. PATENT DOCUMENTS

| | | | |
|---|---|---|---|
| 3,299,417 | 1/1967 | Sibthorpe | 138/114 |
| 3,529,106 | 9/1970 | Little, Jr. | 200/83 B |
| 3,827,828 | 8/1974 | Edwards | 200/83 B |
| 3,974,690 | 8/1976 | Brock, Jr. | 73/40.5 R |
| 4,001,764 | 1/1977 | Holland | 73/40.5 R |
| 4,116,044 | 9/1978 | Garrett | 73/40.5 R |
| 4,153,079 | 5/1979 | Ambrose | 138/103 |

*Primary Examiner*—Gerald P. Tolin
*Attorney, Agent, or Firm*—Sughrue, Rothwell, Mion, Zinn and Macpeak

[57] ABSTRACT

A transport hose floating on the sea surface and transporting petroleum or like fluid from a tanker to an oil reservoir installation on land or vice versa, comprising a leak detector operative in response to the presence of a leak fluid to indicate that portion of the transport hose at which a leak failure occurs.

6 Claims, 3 Drawing Figures

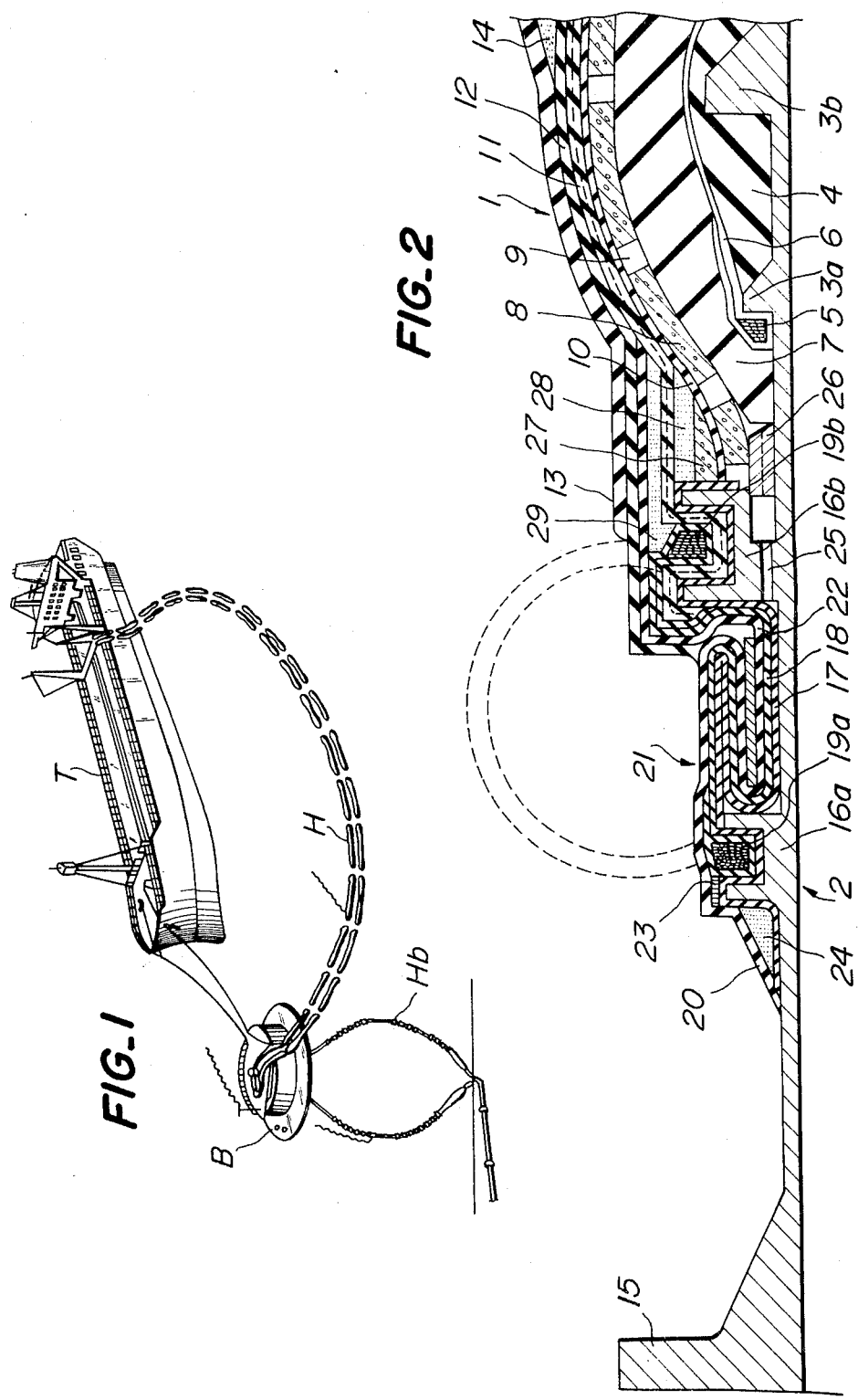

TRANSPORT HOSE WITH LEAK DETECTING STRUCTURE

BACKGROUND OF THE INVENTION

1. Field of the Invention

This invention relates to an improvement in or relating to a transport hose floating on the sea surface and transporting petroleum or like fluid.

2. Description of the Prior Art

In the case of transporting crude oil, for example, from a tanker to an oil reservoir installation on land or vice versa, the tanker anchored off the shore is connected through a floating hose to a buoy installed off shore and the buoy is connected through a hose suspended therefrom and forming a suitable configuration line and a submarine pipe line to the oil reservoir installation on land. In such transport line, the hose required to be resilient, is subjected to a crack failure in its inner surface rubber layer due to aging of the rubber-like material. This often induces a leakage failure of the transport fluid out of the transport line due to separation in the joint between the nipple and rubber. As a result, the leaked crude oil floats on the sea and results in an ocean pollution or like disasters.

Under such circumference, if the fluid leak is not immediately found, the amount of fluid becomes considerably large to pollute the sea for a wide range in and around the leak point, thereby involving a tremendous loss. As a result, if the fluid flow through the hose begins to leak, it is necessary to find out the leak point as soon as possible and take necessary measures such as repair of the leak point or the like. In practice, however, early detection of the leak point has heretofore been extremely difficult since the transport hose is used on the sea surface.

SUMMARY OF THE INVENTION

An object of the invention, therefore, is to provide a transport hose which is connected to a transport line and which can easily and rapidly detect that portion of the transport line at which a fluid leak failure is induced.

A feature of the invention is the provision in a transport hose comprising a hose main body including a reinforcing layer embedded therein and a metal fixture secured to the end of said hose main body, of the improvement comprising a passage arranged in said hose main body and guiding fluid leaked from a transport line up to the end of the hose main body in its axial direction and a leak detector arranged at least one end of said passage and operative by said leak fluid.

Further objects and features of the invention will be fully understood from the following detailed description with reference to the accompanying drawings, in which:

BRIEF DESCRIPTION OF THE DRAWINGS

FIG. 1 is a perspective view of a transport hose according to the invention laid between a tanker on the sea on the one hand and a floating buoy and submarine pipe line on the other hand;

FIG. 2 is an enlarged cross-sectional view of one embodiment of a transport hose according to the invention.

DETAILED DESCRIPTION OF THE PREFERRED EMBODIMENTS

Figure 3:
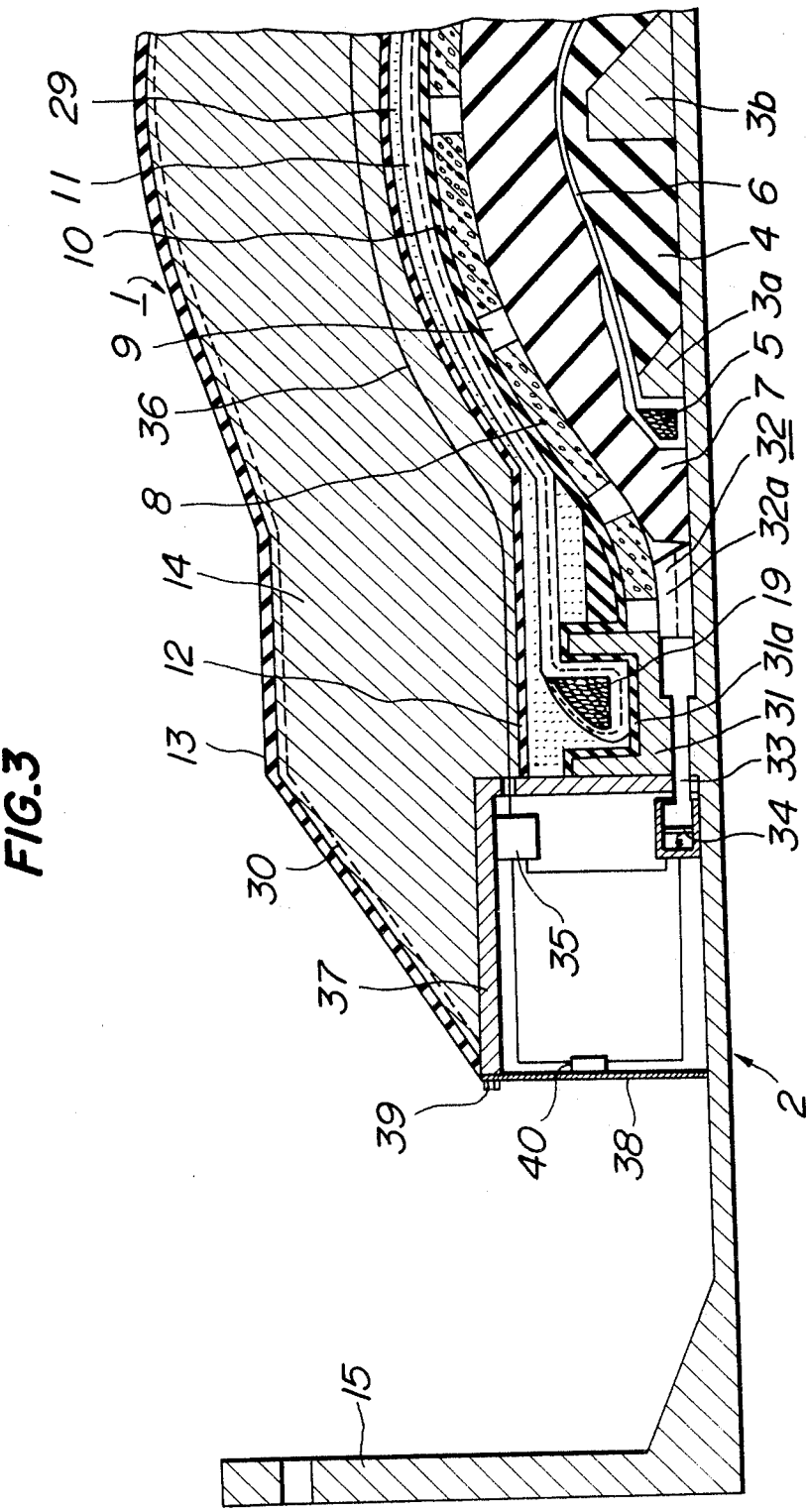
FIG. 3 is an enlarged cross-sectional view of another embodiment of a transport hose according to the invention.

FIG. 1 shows a buoyant hose H according to the invention applied in the case of transporting petroleum or like fluid from a tanker T anchored off the shore through a buoy B floating off shore, a hose Hb suspending from the buoy B and forming a suitable configuration line and a submarine pipe line P to an oil reservoir installation on land (not shown).

FIG. 2 shows one embodiment of a transport hose according to the invention in section. In FIG. 2, reference numeral 1 designates a hose main body and 2 shows a metal fixture or nipple secured to the inner surface of the end of the hose main body 1. The nipple 2 is provided at its outer periphery with a plurality of substantially saw teeth-shaped annular ribs 3a, 3b spaced apart from each other in the axial direction of the nipple 2.

In the present embodiment, the hose main body 1 is composed of an inner surface rubber layer 4 covering the outer surface of the nipple 2, a cord reinforcing layer 6 superimposed about the inner surface rubber layer 4 and wound around a bead wire 5 located beyond the annular rib 3a from the inside toward the outside thereof to form a turnback portion, an intermediate rubber layer 7 superimposed about the cord reinforcing layer 6, and a resilient body 8 helically wound around the intermediate rubber layer 7 and including a passage 9 formed between adjacent turns of the helically formed resilient body 8. About the outside of the helical formed resilient body 8 are superimposed a rubber lining sheet layer 10, rubberized cord reinforcing layer 11, intermediate rubber layer 12 and weather resistant outer cover rubber layer 13 one upon the other in the order mentioned above. Reference numeral 14 designates a buoyant material arranged at the center part of the hose main body 1 and sandwiched between the intermediate rubber layer 12 and the outer cover rubber layer 13. The buoyant material 14 tends to exerts a buoyant force to the hose.

The passage 9 functions to guide the leaking fluid arrived therein through the inner surface rubber layer 4, cord reinforcing layer 6 and intermediate rubber layer 7, for example, in the axial direction of the hose up to the end thereof. The rubber lining sheet layer 10 and rubberized cord reinforcing layer 11 serve to prevent the leak fluid arrived at the passage 9 from leaking outwardly in the radial direction. The resilient body 8 is preferably formed of a foamed substance including continuous bubbles. As a result, the resilient body 8 permits the leaking fluid to easily pass from any position therethrough to the passage 9.

In the present embodiment, the nipple 2 is provided at each end with a flange 15 for connection with the ends of hoses to be interconnected and at its intermediate portion with two depressions 16a, 16b spaced apart from each other in the axial direction of the nipple 2. These depressions 16a, 16b are of channel-shaped in section and covered with a flexible rubber sheet 17 which is folded within a space between the depressions 16a, 16b and including a reinforcing layer embedded therein, if necessary. About the flexible rubber sheet 17 a rubberized fabric 18 is superimposed. Each end of the rubberized fabric 18 is wound around a bead wire 19a, 19b enclosed in the channel-shaped depressions 16a, 16b and hermetically sealed together with the rubber sheet 17 to the depressions 16a, 16b. About the rubberized fabric 18 is superimposed a rubber sheet 20. The rubber sheet 20, rubberized fabric 18 and flexible rubber sheet 17 as a whole constitute a flexible bag 21. Reference numeral 22 designates a coloring agent releasably sandwiched between the folded rubber sheets 20, 20 and exposed to the outer surface of the flexible bag 21 and 23, 24 show binding cords for fixing the rubber sheet 7 to both the depression 16a and the surface of the nipple 2.

In the junction between the flexible bag 21 and the hose main body 1, the depression 16b is provided at its base with one or a plurality of holes 25 extended therethrough and communicating the passage 9 with the inside of the flexible bag 21. Between the intermediate rubber layer 7 and the depression 16b an annular belt is arranged having a depression connecting the passage 9 to the hole 25. In addition, between the rubber lining sheet layer 10 and the cord reinforcing layer 11 are sandwiched a foamed substance 27 and a binding cord 28 disposed one upon the other in the order as mentioned to firmly secure the end of the intermediate rubber layer 7, resilient body 8 and rubber lining sheet layer 10 and the annular belt 26 to the nipple 2. The cord reinforcing layer 11 disposed on the binding cord 28 extends between the rubber sheet 17 and the rubberized fabric 18 and along the inside surface of depression 16b. This cord reinforcing layer 11 and the turn-back portion of the rubberized fabric 18 are firmly secured by a binding cord 29 to the inside surface of the depression 16b. The rubber sheet 20 extends between the binding cord 29 and the intermediate rubber layer 12 until the rubber sheet 20 makes contact with the cord reinforcing layer 11. In addition, the intermediate rubber layer 12 extends up to the outer surface of the flexible bag 21 folded between the depressions 16a, 16b. As a result, it is possible to firmly secure and hermetically seal the flexible bag 21 to the hose main body 1.

In the transport hose constructed as above described, if the hose main body 1 is separated from the surface of the nipple 2, the fluid transported through the hose flows through the boundary between the hose main body 1 and the nipple 2 reaches to the annular belt 26. It then flows through the depression and hole 25 into the inside of the flexible bag 21.

If the fluid transported through the hose leaks through the inner surface rubber layer 4, cord reinforcing layer 6 and intermediate rubber layer 7 in the radial direction of the hose, the fluid is prevented from leaking outwardly by the rubber lining sheet layer 10. As a result, the fluid flows through the passage 9, preferably, both the passage 9 and the resilient body 8, the above mentioned depression in the annular belt 26 and hole 25 into the inside of the flexible bag 21.

The passage 9 is helically formed, so that even when only one passage 9 is used the leaked fluid flows into the passage 9 in a relatively easy manner.

As a result, the pressure of the leak fluid is applied to the flexible bag 21 and causes it to inflate as shown by dotted lines. Thus, it is possible to detect the presence or absence of the fluid leak from the outside of the hose in an easy and rapid manner. In addition, the deformation of the flexible bag 21 causes the coloring agent 22 to be dropped onto the sea to color the sea water, and the leaked fluid can easily be detected. Instead of inserting the coloring agent 22 between the folded portions of the rubber sheet 20, the folded portions of the rubber sheet 20 may be colored and such colored portion may be exposed to the outside of the flexible bag 21 when it is inflated.

FIG. 3 shows another embodiment of a transport hose according to the invention in section. In the present embodiment, about a rubberized cord reinforcing layer 11 having a cord angle of 45° are superimposed a binding cord 29, intermediate rubber layer 12, buoyant material 14, binding cord 30 and outer cover rubber layer 13.

In the present embodiment, a nipple 2 is provided at its intermediate portion with a channel-shaped depression 31a. The channel-shaped depression 31a is covered with a rubber lining sheet 10 extending from the hose main body side. The front end of the rubberized cord reinforcing layer 11 is wound around a bead wire 19 enclosed in the channel-shaped depression 31a to form a turn-back portion, thereby firmly securing the end of the rubberized cord reinforcing layer 11 to the inner surface of the depression 31. About the rubberized cord reinforcing layer 11 the binding cord layer 29 and rubber lining sheet layer 12 are superimposed to hermetically seal the depression 31a to the nipple 2.

In the transport hose constructed as above described, the transport fluid leaked through the inner surface rubber 4, cord reinforcing layer 6 and intermediate rubber layer 7 is prevented from further leaking by the rubber lining sheet layer 10. As a result, the leaked fluid flows through the passage 9 or flexible body 8, a depression 32a of an annular belt 32 located at the end of the hose main body and interposed between the intermediate rubber layer 7 and the depression 31 to one or a plurality of holes 33 provided in the base of the receiving depression 31 and communicated with the passage 9. With the hole 33 a leak detector 34 such as a conventional pressure switch communicates for producing an electric signal when subjected to the fluid pressure.

If the pressure of the leaked fluid is applied to the leak detector 34, it operates to deliver an electric signal. This electric signal is transmitted through a transmitter 35 and an antenna 36 embedded in the buoyant material 14 and composed of a vinyl covered copper wire to the outside.

The antenna 36 may be formed into any suitable shape provided that the antenna 36 is embedded in the foamed buoyant material 14. But, it is preferable to extend the antenna 36 along the axial direction of the hose main body as shown in FIG. 3 for the purpose of making the arrival distance of the transmitted electric wave long.

In FIG. 3, reference numeral 37 designates an iron frame structure for enclosing the leak detector 34 and transmitter 35 therein, 38 shows a ring-shaped cover and 39 illustrates a bolt for securing the cover 38 to the frame structure 37.

It is preferable to secure the leak detector 34, transmitter 35 and an electric supply source battery 40 to the inner surface of the cover 26 and apply the pressure of the fluid through the hole 33 and a flow pipe (not shown) to the leak detector 34 secured to the inner surface of the cover 38. As a result, it is possible to easily inspect or exchange the consumable battery 40, the leak detector 34 and the transmitter those tend to degrade their operating efficiency.

The invention is not limited to the embodiments described with reference to the drawings. For example, provision may be made of a plurality of helically formed passages or the nipple may be provided at its inside and outside surfaces with depressions.

As stated hereinbefore, the transport hose according to the invention is capable of preventing the transport fluid from leaking outside the hose and easily and rapidly detecting the leak of the fluid from the hose main body portions. Thus, the transport hose according to the invention can positively eliminate the ocean pollution or other disasters.

In addition, the embodiment of a transport hose according to the invention shown in FIG. 3 is capable of transmitting a leak signal delivered from the leak detector through the antenna arranged outside the cord reinforcing layer 11 to a receiver on land or on ships. As a result, it is possible to make attenuation of the transmitted electric wave a minimum. In addition, since the antenna is embedded in the buoyant material located inside the outer cover rubber, the antenna can effectively be prevented from being damaged when the transport hose comes into contact with ships.

What is claimed is:

1. In a fluid transport hose comprising a hose main body including a reinforcing layer embedded therein and a metal fixture secured to the end of said hose main body, the improvement comprising; a passage composed of a continuous channel in a resilient body and arranged in said hose main body in the axial direction thereof and guiding leaking fluid from a transport line up to the end of said hose main body in its axial direction and a leak detector arranged at, at least one end of said passage and operative by said leaking fluid, said channel existing in said resilient body prior to any leaking fluid passing from said transport line to said channel.

2. The transport hose according to claim 1, wherein said resilient body is helically formed and said channel is formed between adjacent turns of said helically formed resilient body.

3. The transport hose according to claim 1, wherein said leak detector is composed of a flexible bag located between two portions of said hose main body apart from each other in the axial direction of the hose main body and hermetically sealed in a deflated and folded condition to the outside of said metal fixture, said passage communicating with the inside of said flexible bag.

4. The transport hose according to claim 3, wherein said metal fixture is provided with two depressions into which are secured two end portions of said flexible bag, said two end portions of said flexible bag being wound around bead wires and firmly fastened to the bottom of the depression by means of the bead wires, said passage being extended through one of said depressions.

5. The transport hose according to claim 3, wherein said flexible bag is provided under its deflated and folded condition with a coloring agent sandwiched between two outside folded surfaces of the folded flexible bag.

6. The transfer hose according to claim 1, wherein said leak detector is composed of a pressure switch producing a detection signal in response to said leaking fluid and adapted to transmit said detection signal through an antenna embedded in a buoyant material in said hose main body.

* * * * *